(12) United States Patent
Thomas (10) Patent No.: US 12,521,216 B2
(45) Date of Patent: Jan. 13, 2026

(54) CONNECTOR FOR A DENTAL VALVE

(71) Applicant: Stoma Ventures, LLC, Chesterfield, MO (US)

(72) Inventor: Charles Thomas, Vero Beach, FL (US)

(73) Assignee: STOMA VENTURES, LLC., Chesterfield, MO (US)

( * ) Notice: Subject to any disclaimer, the term of this patent is extended or adjusted under 35 U.S.C. 154(b) by 74 days.

(21) Appl. No.: 17/525,065

(22) Filed: Nov. 12, 2021

(65) Prior Publication Data
US 2023/0149139 A1 May 18, 2023

(51) Int. Cl.
*A61C 17/12* (2006.01)

(52) U.S. Cl.
CPC .......... *A61C 17/13* (2019.05); *A61C 2203/00* (2013.01)

(58) Field of Classification Search
CPC .............................. A61C 17/06–135
USPC ........................................................... 433/95
See application file for complete search history.

(56) References Cited

U.S. PATENT DOCUMENTS

| | | | |
|---|---|---|---|
| 4,083,115 A * | 4/1978 | McKelvey | A61C 17/08 433/96 |
| 4,861,266 A * | 8/1989 | Ashiku | A61C 17/08 433/95 |
| 4,966,551 A * | 10/1990 | Betush | A61C 17/08 604/32 |
| 5,123,840 A * | 6/1992 | Nates | A61C 17/08 433/91 |
| 5,263,860 A * | 11/1993 | Shen | A61C 17/06 433/91 |
| 5,728,078 A * | 3/1998 | Powers, Jr. | A61M 1/84 604/323 |
| 5,741,134 A * | 4/1998 | Davis | A61C 17/08 433/91 |
| 5,743,736 A * | 4/1998 | Folko | A61C 17/08 433/96 |
| 5,876,384 A * | 3/1999 | Dragan | A61C 17/096 433/91 |
| 9,044,294 B1 * | 6/2015 | Herdocia | A61C 17/08 |
| 11,304,787 B2 * | 4/2022 | Thomas | A61C 17/065 |
| 2001/0024778 A1 * | 9/2001 | Hoffman | A61C 17/08 433/91 |
| 2005/0004520 A1 * | 1/2005 | Lemoine | A61C 17/13 604/118 |
| 2008/0265565 A1 * | 10/2008 | Sitz | F16L 27/093 285/98 |
| 2013/0164706 A1 * | 6/2013 | Odabashian | A61M 39/1055 433/92 |
| 2013/0224681 A1 * | 8/2013 | Smith | A61C 17/0208 433/90 |
| 2014/0239551 A1 * | 8/2014 | Williams | B29C 45/00 264/328.13 |
| 2014/0272783 A1 * | 9/2014 | Harris | A61C 17/06 433/95 |
| 2017/0246362 A1 * | 8/2017 | Crawford | A61M 1/86 |
| 2021/0045856 A1 * | 2/2021 | Thomas | A61C 1/0061 |
| 2021/0204923 A1 * | 7/2021 | Ritter | A61B 1/32 |
| 2021/0338398 A1 * | 11/2021 | Thomas | A61C 17/08 |
| 2021/0402077 A1 * | 12/2021 | Cushner | A61B 1/015 |

(Continued)

*Primary Examiner* — Matthew M Nelson
(74) *Attorney, Agent, or Firm* — David H. Chervitz (57) ABSTRACT

A connector for a dental valve has a body having an exterior surface, a valve receiving end, a tip receiving end, a lumen formed between the valve receiving end and the tip receiving end, a front section, a center section, and a rear section.

20 Claims, 6 Drawing Sheets

(56) References Cited

U.S. PATENT DOCUMENTS

2022/0104927 A1* 4/2022 Hoffman .............. A61C 17/096
2022/0160462 A1* 5/2022 Wickheim .............. A61C 1/12
2023/0149139 A1* 5/2023 Thomas ................. A61C 17/13
                                                            433/95

* cited by examiner

CONNECTOR FOR A DENTAL VALVE

BACKGROUND

This disclosure relates to a connector for an ejector or an evacuator for a dental valve and more particularly to a connector for securing a high volume evacuator or a low volume evacuator (saliva ejector) to a dental valve.

During a dental procedure it is important to be able to remove saliva, blood, tooth fragments, metals, and other debris from the mouth of a patient. Removal of this matter allows a dentist to be able to perform a procedure in an unobstructed manner. Various systems or devices have been developed to remove liquid and solid materials from a mouth during a dental procedure. One device that is capable of removing saliva is known as a saliva ejector, tip, or straw. A saliva ejector typically comprises a plastic flexible tube, straw, or tip for placement in the mouth of a patient. The saliva ejector tip is connected to a dental valve and the valve is connected to a hose or to a tailpiece that is connected to the hose. The hose is connected to a source of vacuum. In this manner, saliva is passed through the ejector tip, the valve, the tailpiece, and the hose to be disposed of in a sanitary manner. Once the procedure is completed, the ejector tip should be discarded and the valve should be replaced. The used valve should also be sterilized by autoclaving to be used again. Although it is suggested to autoclave the valve after use, it is known that autoclaving is hardly ever done. Another device that is capable of removing solid materials is a high volume evacuator system, tip, or straw. A high volume evacuator system generally consists of a tube, straw, or tip that may be inserted into a mouth of a patient with the tube connected to a dental valve which is connected to a tailpiece with the tailpiece being connected to a hose or tubing that is in fluid communication with a source of vacuum. Again, in this manner, debris may be removed from the mouth of the patient. After the dental procedure, the tip is disposed of and the valve should be replaced. The used valve should also be sterilized by autoclaving to be used again. However, although it is suggested to sterilize the valve after use, it is known that this suggested procedure is hardly ever followed. As can be appreciated, the saliva ejector and the high volume evacuator are used to remove liquids and debris from a mouth of a patient to prevent a patient from swallowing or aspirating liquids and debris produced during a dental procedure.

As indicated, the saliva ejector dental valve or the high volume evacuator dental valve is connected to one end of the dental valve. The dental valve has another end that is mated to the tailpiece or the hosing. The saliva ejector valve and the high volume evacuator valve each has a valve body having a passage or a lumen and a valve sealing member. The valve sealing member has an opening that may be aligned with the passage to allow saliva and other material to pass when the valve sealing member is in an opened position. When the valve sealing member is in a closed position, the source of vacuum is cut off by the valve sealing member blocking the passage through the valve body. In this manner, the saliva ejector valve and the high volume evacuator valve may be opened or closed.

One problem associated with the use of saliva ejector tips and high volume evacuator tips inserted into the dental valves is that there are a number of manufacturers that produce only the tips and a number of manufacturers that only produce the dental valves. The tips vary in size, shape, and stiffness and there is no standardization of the tip between manufacturers. The dental valves also vary in size, shape, and features and there is no standardization of the dental valves between manufacturers. In view of this, it may be difficult to connect or secure the tip to the dental valve. Also, there is the possibility that a manufacturer may produce tips that do not conform to the manufacturer's own specifications. In this case, there may be differences in the same tip manufactured by the same manufacturer. Due to this, a dental valve device requires the use of an O-ring or other elastic member in order to hold or secure a tip in place and to establish a seal between the valve device and the tip. The O-ring is used to hold or secure the tip in place during an operation or dental procedure. Over time the O-ring will deteriorate due to use and cleaning and will have to be replaced. An inventory of different sized O-rings must be available to a technician servicing the dental valve. There is also the possibility that the O-ring may fail during a dental procedure and the tip will become disengaged from the dental valve.

Although these tips and dental valves are beneficial, one disadvantage associated with their use is that there is no standardization available for the tips and the dental valves. For example, one manufacturer may produce a dental valve that has a tip receiving end of one configuration and another manufacturer may produce a dental valve having a tip receiving end of different dimensions or a different configuration. Mating these different valves to a tip may be difficult, if not impossible. Another problem associated with the use of different tips and dental valves is that a technician will be required to keep track of the various tailpieces, tips, and dental valves that are used and stored. If an error occurs in the use or storage of such devices then a dental station may not be able to be used for a dental procedure. For example, if a dental office runs out of clean dental valves of a certain size and shape that will fit onto a specific tip then a saliva ejector may not be available for a dental procedure. If this were to occur then a scheduled dental procedure would have to be canceled. Further, in a single station dental practice, it may be necessary to cancel many appointments. Also, in a very busy dental practice, having one station out of commission for a period time may also require that several appointments will have to be canceled and rescheduled. As can be appreciated, this will result in lost revenue for the dental practice and should be avoided. Likewise, if there is a dental emergency then the dentist may not be able to provide emergency services.

Therefore, it would be desirable to have a connector that is capable of securing or mating a tip to a dental valve. This would assist in providing a vacuum seal between the valve and the tip to prevent malfunctioning during a dental procedure. It would also be advantageous to provide a connector that is used to attach a tip to a dental valve so that a tip of any size, shape, or hardness may be used with any dental valve. It would be further advantageous to provide a connector that includes a fanciful feature or device to be enjoyed by a child during a dental operation. It would be desirable to have a connector that is universal and may be used to connect any sized tip to a dental valve. Further, it would be beneficial to provide a connector that is disposable for a single use to prevent contamination.

BRIEF SUMMARY

In one form of the present disclosure, a connector for a dental valve comprises a body having an exterior surface, a valve receiving end, a tip receiving end, a lumen formed between the valve receiving end and the tip receiving end, a front section, a center section, and a rear section In another form of the present disclosure, a connector for a dental valve comprises a body having an exterior surface, a valve receiving end, a tip receiving end, a lumen formed between the valve receiving end and the tip receiving end, a front section, a center section, a rear section, and an interior surface with the interior surface having an annular inclined section at the tip receiving end.

In yet another form of the present disclosure, a connector for a dental valve comprises a body having an exterior surface, a valve receiving end, a tip receiving end, a lumen formed between the valve receiving end and the tip receiving end, a front section, a center section, a rear section, and an interior surface with the interior surface having a first front nub extending out of the interior surface at the tip receiving end.

The present disclosure provides a connector for a dental valve that allows any sized and shaped tip to be mated to a dental valve.

The present disclosure provides a connector for a dental valve that is easy to install on the tip and the dental valve.

The present disclosure provides a connector for a dental valve that is small, lightweight, easy to handle, easy to install, and easy to use.

The present disclosure also provides a connector for a dental valve which is of simple construction and design and which can be easily employed with highly reliable results.

The present disclosure is also directed to a connector for a dental valve that does not require any special tools to attach the connector between the tip and the dental valve.

The present disclosure is related to a connector for a dental valve that can be connected to a disposable dental valve device.

The present disclosure provides a connector for a dental valve that may be disposable for a single use or dental operation.

The present disclosure is also directed to a connector for a dental valve that is made of a lightweight material such as plastic, polyethylene, and high density polyethylene or any other similar material so that the connector may be disposable.

The present disclosure is related to a connector for a dental valve that may be used to allow dental valves of various sizes to be easily mated to the tip.

The present disclosure also provides a connector for a dental valve that may have incorporated therein or coated thereon an antimicrobial agent or chemical to further protect against cross-contamination when using the connector.

The present disclosure is directed to a connector for a dental valve that includes a fanciful element to pacify or amuse a child during a dental procedure.

These and other advantages of the present disclosure will become apparent after considering the following detailed specification in conjunction with the accompanying drawings, wherein:

DETAILED DESCRIPTION OF A PREFERRED EMBODIMENT

Figure 1:
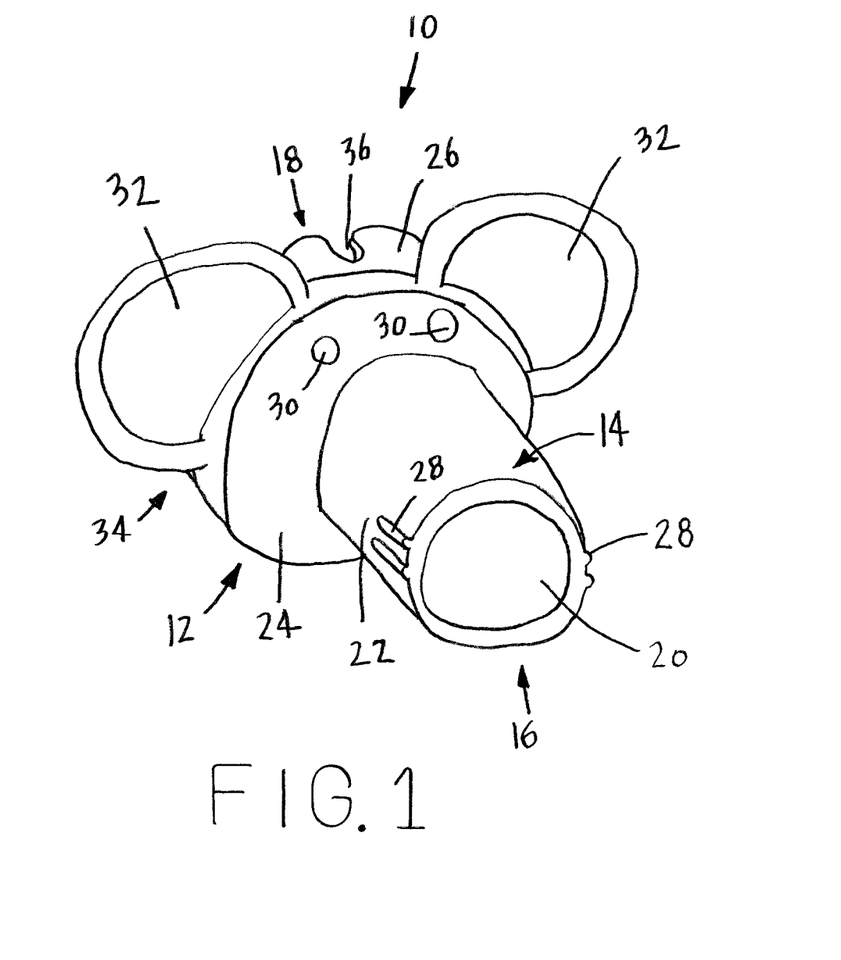
FIG. 1 is a front perspective view of a connector for a dental valve constructed according to the present disclosure.

Referring now to the drawings, wherein like numbers refer to like items, number 10 identifies a connector for a tip for a dental valve constructed according to the present disclosure. With reference now to FIG. 1, the connector 10 comprises a body 12 having an exterior surface 14, a tip receiving end 16, a valve receiving end 18, and a lumen or channel 20 formed between the tip receiving end 16 and the valve receiving end 18. The channel 20 allows any liquid, saliva, blood, tooth fragments, or other debris to flow there through. The connector 10 also has a front or nose section 22, a center or head section 24, and a rear section 26. The nose section 22 may have whiskers 28 formed thereon. The head section may have a pair of eyes 30 and a pair of ears 32. In this manner, the whiskers 28, the eyes 30, and the ears 32 may form a fanciful mouse design 34 that is presented to a patient. Although the mouse design 34 is depicted it is also possible and contemplated to present any other design, such as another animal or a cartoon character, that will placate a patient, such as a child, during a dental procedure. The rear section 26 also has a notch 36 formed therein. The connector 10 may be formed of any suitable material so that the connector 10 is disposable.

Figure 2:
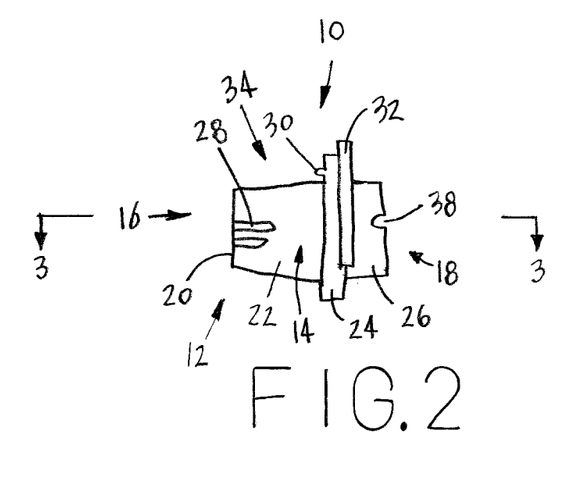
FIG. 2 is a side view of the connector for a dental valve constructed according to the present disclosure.

FIG. 2 illustrates a side view of the connector 10. The connector 10 has the body 12 having the exterior surface 14, the tip receiving end 16, the valve receiving end 18, and the lumen or channel 20 that extends between the tip receiving end 16 and the valve receiving end 18. The channel 20 allows any liquid, saliva, blood, tooth fragments, or other debris to flow there through. The connector 10 also has the front or nose section 22, the center or head section 24, and the rear section 26. The nose section 22 shows the whiskers 28 formed thereon. The head section has the pair of eyes 30 and the pair of ears 32. The whiskers 28, the eyes 30, and the ears 32 form the fanciful mouse design 34 that is presented to a patient. The rear section 26 also has another notch 38 formed therein. The reason for the notches 36 and 38 will be explained in detail herein. Further, it is contemplated that there may be more notches formed in the rear section 26.

Figure 3:
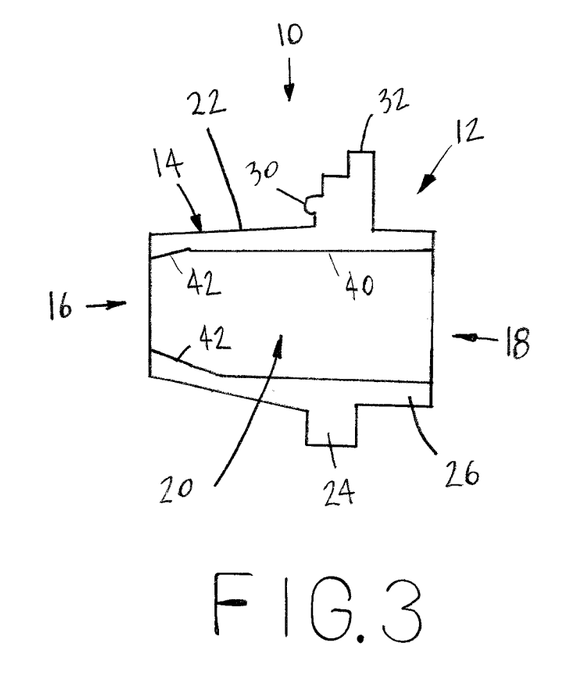
FIG. 3 is an enlarged cross-sectional view of the connector for a dental valve taken along the plane of line 3-3 in FIG. 2.

With reference now to FIG. 3, a cross-sectional view of the connector 10 is shown. The connector 10 has the body 12 having the exterior surface 14, the tip receiving end 16, the valve receiving end 18, and the lumen 20 formed between the tip receiving end 16 and the valve receiving end 18. The connector 10 also has the front or nose section 22, the center or head section 24, and the rear section 26. The head section also has one of the eyes 30 and one of the ears 32. The body 12 has an interior surface 40. The interior surface 40 has an inclined section 42 in the front section 22 for receiving and capturing a saliva ejector (not shown) as will be described in detail further herein. The inclined section 42 annular and is used to secure the ejector within the lumen 20 of the connector 10.

Figure 4:
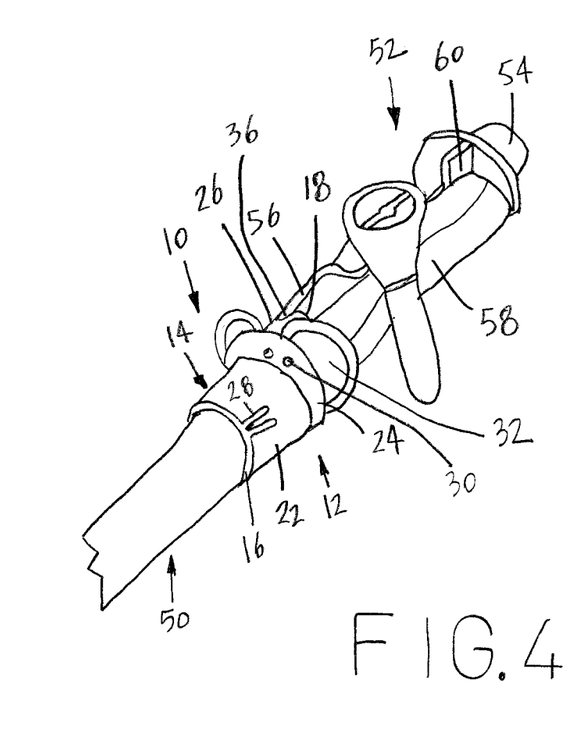
FIG. 4 is a perspective view of the connector for a dental valve connected to a dental valve and a saliva ejector.

FIG. 4 depicts the connector 10 being positioned between a saliva ejector 50 and a dental valve device 52. The connector 10 is used to mate the saliva ejector 50 to the dental valve device 52. The dental valve device 52 has a tailpiece or hose receiving end 54 and a front rib 56, a side rib 58, and a rear rib 60. The connector 10 has the body 12 having the exterior surface 14, the tip receiving end 16, and the valve receiving end 18. The connector 10 also has the front section 22, the center section 24, and the rear section 26. The nose section 22 shows the whiskers 28 formed thereon. The head section has the pair of eyes 30 and the pair of ears 32. The notch 36 is used to receive the front rib 56 of the dental valve device 52. It is also possible and contemplated that the connector 10 may be constructed with the saliva ejector 50 as a single piece. The ejector 50 may be adhered to the connector 10 or may be molded or formed with the connector 10.

In operation of the connector 10, the connector 10 may be initially inserted into the dental valve 52. Once the connector 10 is inserted, the ejector 50 may be inserted into the connector 10 to secure the ejector 50 to the dental valve device 52. The annular inclined section 42 (FIG. 3) is used to secure the ejector 50 withing the channel 20 (FIG. 3) As is known, a tailpiece (not shown) is connected to a hose (not shown) and the hose is connected to a suction system (also not shown). The ejector or evacuator tip 50 may then placed in a mouth of a dental patient during a procedure to remove debris or fluids from the mouth. As can be appreciated, the design 34 displayed to the patient may pacify a young patient who may be apprehensive about a dental procedure. Once the dental valve 52 is opened, air is allowed to flow through the evacuator tip 50, the connector 10, the dental valve 52, the tailpiece, the hose, and into the suction system for disposal. When suction is not needed during a dental procedure, the dental valve 52 is closed. Further, once a dental procedure has been completed, the dental valve 52 is closed, removed from the tailpiece and the ejector 50, the connector 10, and the dental valve device 52 are discarded. In this manner the connector 10 is a disposable or one time use device. As can be appreciated, to begin a new dental procedure for an adult patient an ejector 50 and a dental valve device 52 may be inserted into the tailpiece. Also, if a new dental procedure is being conducted on a young patient an ejector 52, a connector 10, and a dental valve device 52 may be inserted into the tailpiece.

Figure 5:
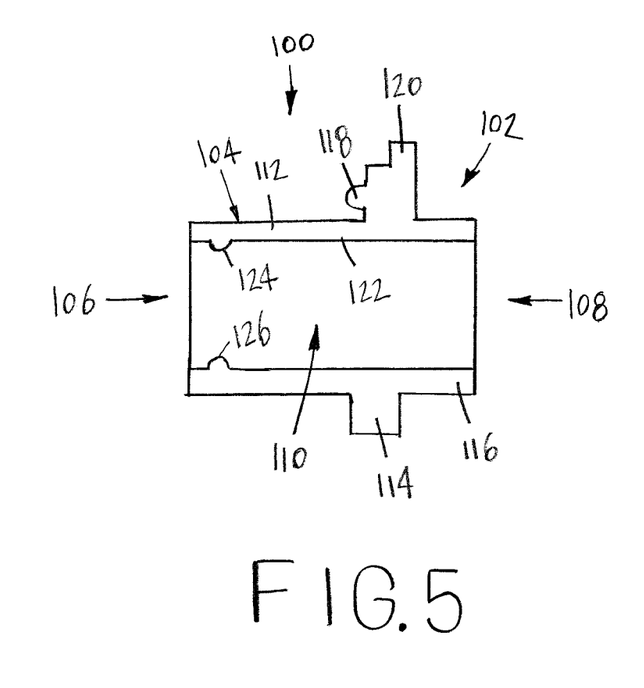
FIG. 5 is a cross-sectional view of another embodiment of a connector for a dental valve constructed according to the present disclosure.

Referring now to FIG. 5, a cross-sectional view of another embodiment of a connector 100 constructed according to the present disclosure is shown. The connector 100 has a body 102 having an exterior surface 104, a tip receiving end 106, a valve receiving end 108, and a lumen 110 formed between the tip receiving end 106 and the valve receiving end 108. The connector 100 also has a front or nose section 112, a center or head section 114, and a rear section 116. The head section 114 has an eye 118 and an ear 120. The body 102 has an interior surface 122. The interior surface 122 has a first nub or protrusion 124 extending out from the interior surface 122 and a second nub or protrusion 126 extending out from the interior surface 122. The nubs 124 and 126 are positioned near the tip receiving end 106 and are used for receiving and capturing a saliva ejector (not shown). Although not shown in this cross-sectional view, it is possible that the body 102 may also have whiskers, another eye, and another ear to present a fanciful design to a patient.

Figure 6:
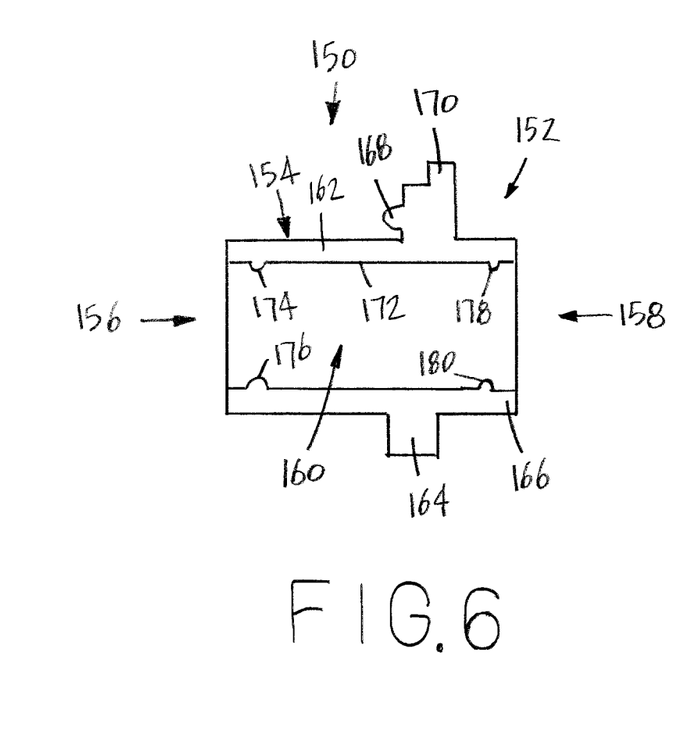
FIG. 6 is a cross-sectional view of another embodiment of a connector for a dental valve constructed according to the present disclosure.

FIG. 6 illustrates a cross-sectional view of another embodiment of a connector 150 constructed according to the present disclosure. The connector 150 has a body 152 having an exterior surface 154, a tip receiving end 156, a valve receiving end 158, and a lumen 160 formed between the tip receiving end 156 and the valve receiving end 158. The connector 150 also has a front or nose section 162, a center or head section 164, and a rear section 166. The head section 164 an eye 168 and an ear 170. The body 152 has an interior surface 172. The interior surface 172 has a first front nub or protrusion 174 extending out from the interior surface 172 and a second front nub or protrusion 176 extending out from the interior surface 172. The front nubs 174 and 176 are positioned near the tip receiving end 156 and are used for receiving and capturing a saliva ejector (not shown). The front nubs 174 and 176 secure the ejector in place by frictional engagement. The interior surface 172 also has a first rear nub or protrusion 178 extending out from the interior surface 172 and a second rear nub or protrusion 180 extending out from the interior surface 172. The rear nubs 178 and 180 are positioned near the valve receiving end 158. The rear nubs 178 and 180 are used to secure a dental valve device (not shown) in place by friction. Although a pair of rear nubs 178 and 180 are shown it is possible that the nubs 178 and 180 are a single annular protruding ring or nub that may snap fit on to a dental valve device. As should be appreciated, it is contemplated that the body 152 may also have whiskers, another eye, and another ear to present a fanciful design to a patient during a dental procedure. It is further possible that the connector 150 may be formed as a single structure with a saliva ejector and the rear nubs 178 and 180 serve to mate and secure the connector 150 to a dental valve device.

The connectors 10, 100, and 150 may be formed of any suitable material such as metal, plastic, polyethylene, high density polyethylene, or any other material. Any suitable material may be used to construct the connectors 10, 100, and 150 so that the connectors 10, 100, and 150 may withstand use in a dental operation or procedure. Further, it is also possible and contemplated to incorporate the antimicrobial agent or chemical in the connectors 10, 100, and 150 or to provide a coating of an antimicrobial agent on the connectors 10, 100, and 150 to further prevent cross-contamination when using the connectors 10, 100, and 150 during a dental operation or procedure.

From all that has been said, it will be clear that there has thus been shown and described herein a connector for a dental valve which fulfills the various advantages sought therefore. It will become apparent to those skilled in the art, however, that many changes, modifications, variations, and other uses and applications of the subject connector for a dental valve are possible and contemplated. All changes, modifications, variations, and other uses and applications which do not depart from the spirit and scope of the disclosure are deemed to be covered by the disclosure, which is limited only by the claims which follow.

What is claimed is:

1. A connector for a dental valve comprising:
 a body having an exterior surface, a valve receiving end having an annular ring surface, a tip receiving end, a lumen formed between the valve receiving end and the tip receiving end, a front section, a rear section, a center section that extends radially out from the exterior surface to form an enlarged diameter portion having a maximum outer diameter that is greater than both the front section and the rear section, and an ear that extends out from the enlarged diameter portion of the center section, and the rear section having a notch that extends axially into the exterior surface and the annular ring surface from an exterior opening and extends radially inward into the rear section toward the tip receiving end, wherein the notch has a depth that extends completely through the annular ring surface to create an axial groove configured for mechanically interlocking with and securely receiving therein a front rib of a dental valve to prevent rotational movement between the connector and the dental valve during use and wherein the body defines a single flow path from the tip receiving end to the valve receiving end without any auxiliary air inlet opening for vacuum release or suction control.

2. The connector for a dental valve of claim 1 wherein the front section has whiskers formed in the exterior surface.

3. The connector for a dental valve of claim 1 wherein the center section has a pair of eyes and another ear.

4. The connector for a dental valve of claim 1 wherein the dental valve further comprises a side rib and the rear section has a second notch that extends axially into the annular ring surface from the exterior opening and extends radially inward into the rear section toward the tip receiving end, wherein the second notch has a depth that extends completely through the annular ring surface to create an axial groove configured for mechanically interlocking with and securely receiving therein the side rib of the dental valve to prevent rotational movement between the connector and the dental valve during use.

5. The connector for a dental valve of claim 1 wherein the front section has whiskers formed in the exterior surface, the center section has a pair of eyes and another ear, with the whiskers, the eyes, and the ears forming a face.

6. The connector for a dental valve of claim 1 wherein the rear section further comprises a second notch that extends into the rear section toward the tip receiving end and a third notch that extends into the rear section toward the tip receiving end.

7. The connector for a dental valve of claim 1 wherein the rear section further comprises a second notch that extends into the rear section toward the tip receiving end.

8. A connector for a dental valve comprising:
a body having an exterior surface, a valve receiving end having an annular ring surface, a tip receiving end, a lumen formed between the valve receiving end and the tip receiving end, a front section, a rear section, a center section that extends radially out from the exterior surface to form an enlarged diameter portion having a maximum outer diameter that is greater than both the front section and the rear section, the enlarged diameter portion having a face and an ear that extends out from the enlarged diameter portion of the center section, the rear section having a notch that extends axially into the exterior surface and the annular ring surface from an exterior opening and extends radially inward into the rear section toward the tip receiving end, wherein the notch has a depth that extends completely through the annular ring surface to create an axial groove configured for mechanically interlocking with and securely receiving therein a front rib of a dental valve to prevent rotational movement between the connector and the dental valve during use, an interior surface with the interior surface having an annular inclined section at the tip receiving end, wherein the enlarged diameter section of the center section that extends radially outward provides a gripping surface for manual manipulation of the connector during installation and removal, and wherein the body defines a single flow path from the tip receiving end to the valve receiving end without any auxiliary air inlet opening for vacuum release or suction control.

9. The connector for a dental valve of claim 8 wherein the front section has whiskers formed in the exterior surface.

10. The connector for a dental valve of claim 8 wherein the face has a pair of eyes and another ear.

11. The connector for a dental valve of claim 8 wherein the front section has whiskers formed in the exterior surface, and the face has a pair of eyes and another ear.

12. The connector for a dental valve of claim 8 wherein the rear section further has a second notch that extends into the rear section toward the tip receiving end.

13. The connector for a dental valve of claim 8 wherein the dental valve further comprises a side rib and the body further comprises a second notch that extends into the annular ring surface and the rear section toward the tip receiving end with the second notch for receiving therein the side rib of the dental valve.

14. The connector for a dental valve of claim 8 further comprising an antimicrobial agent incorporated into the connector.

15. A connector for a dental valve comprising:
a body having an exterior surface, a valve receiving end having an annular ring surface, a tip receiving end, a lumen formed between the valve receiving end and the tip receiving end, a front section, a rear section, a center section that extends radially out from the exterior surface to form an enlarged diameter portion having a maximum outer diameter that is greater than both the front section and the rear section, and an ear that extends out from the enlarged diameter section of the center section, the rear section having a notch that extends axially into the exterior surface and the annular ring surface from an exterior opening and extends radially inward into the rear section toward the tip receiving end, wherein the notch has a depth that extends completely through the annular ring surface to create an axial groove configured for mechanically interlocking with and securely receiving therein a front rib of a dental valve to prevent rotational movement between the connector and the dental valve during use, an interior surface with the interior surface having a first front nub extending out of the interior surface at the tip receiving end into the lumen, wherein the enlarged diameter section of the center section that extends radially outward provides a gripping surface for manual manipulation of the connector during installation and removal, and wherein the body defines a single flow path from the tip receiving end to the valve receiving end without any auxiliary air inlet opening for vacuum release or suction control.

16. The connector for a dental valve of claim 15 wherein the interior surface further comprises a second front nub extending out of the interior surface at the tip receiving end into the lumen.

17. The connector for a dental valve of claim 15 wherein the interior surface further comprises a first rear nub extending out of the interior surface into the lumen at the valve receiving end.

18. The connector for a dental valve of claim 17 wherein the interior surface further comprises a second rear nub extending out of the interior surface into the lumen at the valve receiving end.

19. The connector for a dental valve of claim 15 wherein the interior surface further comprises a first rear nub extending out of the interior surface into the lumen at the valve receiving end and a second rear nub extending out of the interior surface into the lumen at the valve receiving end.

20. The connector for a dental valve of claim 15 wherein the dental valve further comprises a side rib and the body further comprises a second notch that extends into the annular ring surface and the rear section toward the tip receiving end with the second notch for receiving therein the side rib of the dental valve.

\* \* \* \* \*